United States Patent Office 2,822,384
Patented Feb. 4, 1958

2,822,384

PURIFICATION OF LUBRICATING COMPOSITIONS

James T. Gragson, Bartlesville, Okla., assignor to Phillips Petroleum Company, a corporation of Delaware No Drawing. Application April 28, 1955
Serial No. 504,683

4 Claims. (Cl. 260—504)

This invention relates to purification of lubricating compositions. In one aspect it relates to a method for removing impurities from an alkaline earth petroleum sulfonate derived from high molecular weight hydrocarbons.

This application is related to copending application Serial No. 478,839, filed December 30, 1954, by William B. Whitney, which discloses and claims improved metal petroleum sulfonates derived from high molecular weight petroleum hydrocarbons and a method for producing such metal petroleum sulfonates. In the process of the copending application, highly refined, solvent extracted, high molecular weight petroleum stocks are treated with a sulfonating agent, the reaction product is neutralized with anhydrous ammonia, the resulting ammonium petroleum sulfonate is extracted with an organic solvent, such as alcohol, and is converted to the metal petroleum sulfonate by reaction with an excess of a metal salt or hydroxide.

The hydrocarbon stock preferred for the preparation of the metal petroleum sulfonates is a de-asphalted and solvent-refined petroleum fraction having a viscosity between about 80 and 700 SUS at 210° F. A specifically preferred sulfonation stock is a propane-fractionated, solvent-extracted and de-waxed Mid-Continent oil of about 150 to 230 SUS at 210° F. having a viscosity index of about 85–95 or even higher. Fuming sulfuric acid is the preferred sulfonating agent although other known sulfonating agents can be utilized in the sulfonating step.

Sulfonation temperatures are usually controlled within the range of about 50–200° F. and the oil-acid ratio can be in the range from 1 to 0.175. The neutralization step is usually accomplished by countercurrent contact of the sulfonation product with anhydrous ammonia. The ammonium sulfonates are then extracted from the oil with a polar solvent such as an alcohol and the extract, containing the ammonium sulfonates, is then contacted with an aqueous solution or slurry of the salt, hydroxide or oxide of the metal at a temperature in the range 200–400° F. and at a pressure sufficient to prevent evaporation of the volatile materials present. If a salt solution is used, it is preferred to make a final contacting with the hydroxide of the metal until a sample of the product evolves vapors upon being heated to 500° F., which are not acidic as determined by a test with moist litmus paper.

The water and solvent are removed from the product resulting from the reaction of the extract with the metal salt, oxide or hydroxide slurry, and then filtered to remove excess metal salt, hydroxide or oxide so as to produce the metal petroleum sulfonate.

It is an object of this invention to provide an improved method for the purification of metal petroleum sulfonates derived from high molecular weight hydrocarbons.

It is another object of this invention to provide a method for the separation of an alkaline earth petroleum sulfonate, derived from a high molecular weight hydrocarbon, from ammonium petroleum sulfonates and unreacted high molecular weight hydrocarbon.

It is still another object to provide an improved method for the purification of alkaline earth petroleum sulfonates.

Still further objects and advantages will be apparent to one skilled in the art upon studying the disclosure of this invention.

Broadly speaking, the invention resides in the discovery that alkaline earth petroleum sulfonates, derived from high molecular weight hydrocarbons, are insoluble in hot isopropyl alcohol whereas the ammonium petroleum sulfonates and unreacted high molecular weight hydrocarbons are soluble in hot isopropyl alcohol. I have discovered that after the alkaline earth petroleum sulfonates have been prepared according to the invention of the above referred to copending application, that additional low ash content materials can be extracted from the alkaline earth petroleum sulfonates so as to leave a resulting product exhibiting high ash content and thus representing a more concentrated and highly purified product.

In the process steps for producing metal petroleum sulfonates from high molecular weight hydrocarbons, ammonium sulfonate, produced by sulfonation of the hydrocarbon and neutralization of the resulting sulfonic acids with ammonia, is extracted from the hydrocarbon oil with an organic solvent. Some unreacted hydrocarbons are extracted from the product of the sulfonation step along with the sulfonate and such unreacted hydrocarbons remain in the organic phase in the step of converting the ammonium petroleum sulfonate to the metal petroleum sulfonate. Any inorganic metal salts which may remain in the mixture, resulting from the step of converting the ammonium sulfonate to the metal sulfonate, are separated in the water phase and thus removed from the metal sulfonate. The ammonium sulfonates are substantially all converted to metal sulfonates under the conditions herein set forth, if however, any ammonium sulfonates are not converted to metal sulfonates, they would remain with the metal sulfonates and unreacted hydrocarbons in the organic phase. The process of this invention provides a means for the separation of metal petroleum sulfonates, produced according to the process of the heretofore referred to copending application, from unreacted hydrocarbons and any ammonium petroleum sulfonates which may be present.

The following examples illustrate the invention but are not to be construed as limiting the invention.

EXAMPLE I

A reaction vessel equipped with a stirrer and a circulation pump was charged with 180.7 pounds of a solvent refined and de-waxed lubricating oil derived from Mid-Continent petroleum and having the following properties: viscosity of 4278 SUS at 100° F., a viscosity of 203 SUS at 210° F. and a viscosity index of 93. To this was added with stirring 36 pounds of 20 percent fuming sulfuric acid. During the period of acid addition, the temperature rose from 73 to 97° F. The mixture was stirred for an hour after the acid addition and was then diluted with 5 gallons of pentane and was neutralized by bubbling 11.5 pounds of anhydrous ammonia through the mixture. After neutralization the mixture was heated to 134° F. so as to remove the major portion of pentane and 23.2 gallons of isopropyl alcohol was added to the mixture, amounting to 29.8 gallons, and stirred while the mixture was warmed to 154° F. After settling overnight the alcohol phase, amounting to 17.3 gallons, was withdrawn, and 16.6 gallons of isopropyl alcohol was added to the residue with agitation while the mixture was warmed to 165° F. The alcohol phase, 23.3 gallons, was withdrawn at 160° F. after settling had occurred and 19.3 gallons of fresh alcohol was added to the residue with stirring which was again warmed to 165° F. and allowed to settle. After settling the alcohol phase, amounting to 26.8 gallons was removed from the mixture at 165° F. The fourth extraction was made with 14.6 gallons of isopropyl alcohol at 170° F. and 16 gallons of alcohol phase was recovered. The total alcohol extracts were combined and partially stripped of alcohol so that the final mixture contained 54.5 weight percent ammonium sulfonate and oil and 45.5 weight percent alcohol. A solvent-free sample of the sulfonate analyzed 1.07 percent nitrogen.

A portion of the alcoholic solution, weighing 19.2 pounds, was placed in a reactor with 1.5 pounds $CaCl_2 \cdot 2H_2O$, 4.5 pounds of water and one gallon of pentane. The mixture was stirred for 2½ hours, and after settling the aqueous phase was withdrawn and discarded. To the organic phase was added 1.5 pounds $CaCl_2 \cdot 2H_2O$, 4.5 pounds of water and one gallon of pentane and this mixture was stirred for about 4 hours. After settling the water phase was withdrawn and discarded and the organic phase again stirred with 1.5 pounds $CaCl_2 \cdot 2H_2O$, 4.5 pounds water and ½ gallon pentane. The aqueous phase was removed and the organic phase was treated with 1 pound $CaCl_2 \cdot 2H_2O$, 3 pounds water and 1½ gallons of pentane for 4 hours. After settling the aqueous phase was withdrawn and the solvent phase was stripped of solvent to produce 10.6 pounds of calcium sulfonate. The ash content of the calcium petroleum sulfonate was 5.3 weight percent. The calcium petroleum sulfonate was a dark brown viscous fluid.

A portion of the calcium petroleum sulfonate produced by the above procedure was extracted three times with hot isopropyl alcohol using 2–4 times the volume of the sulfonate of the alcohol for each extraction. The procedure utilized for each extraction was to heat the alcohol-oil mixture to the boiling point of the alcohol and then to allow the mixture to cool slightly (165 to 180° F.) so as to effect a phase separation so that the alcohol layer could be decanted. The alcohol extract was decanted and the insoluble residue, freed of solvent, amounted to 69.5 weight percent of the total material extracted and had an ash content of 6.75 weight percent. The purified calcium petroleum sulfonate was a dark brown, tarry, resinous mass. The alcohol extract, after removal of solvent was a fairly viscous fluid. The purified calcium petroleum sulfonate was completely soluble in a motor grade lubricating oil and thus is more effective, as a detergent, than an equal weight concentration of unpurified calcium petroleum sulfonate.

EXAMPLE II

About 25 pounds of the ammonium petroleum sulfonate of Example I were dissolved in 15 pounds of isopropyl alcohol and 10 gallons of pentane and to this mixture was added a solution of 6 pounds of barium chloride and 16 pounds of water. The mixture was agitated for several hours after which the water layer was drawn off and the oil layer was again agitated for several minutes with 15 pounds of fresh water and allowed to settle. The water layer was then removed and the organic phase was contacted for 30 minutes with 2.1 pounds of barium chloride in 31 pounds of water. After standing overnight, the water layer was withdrawn and the emulsion, which had formed, was broken by addition of 18.5 pounds of pentane and 7 pounds of isopropyl alcohol. The organic phase was removed, filtered and stripped of solvent leaving 25 pounds of barium petroleum sulfonate. The barium sulfonate additive evolved acidic vapors when heated to 350° F. and was stabilized by the addition of dry barium hydroxide and then by heating to 200° F. for several minutes followed by filtering to remove excess barium hydroxide and inorganic products. The stabilized product did not evolve acidic vapors when heated to 500° F. This stabilized product was a viscous fluid and had an ash content of 10.8 weight percent.

The barium petroleum sulfonate so produced was extracted with about 2 volumes of cold isopropyl alcohol and yielded 4 weight percent alcohol soluble material having an ash content of 0.5 weight percent. An intermediate fraction centrifuged out of the alcohol amounted to an additional 5 weight percent. Extraction of the remaining alcohol insoluble material with about 4 volumes of boiling isopropyl alcohol yielded an additional 13 weight percent of oil-like material having an ash content of 1.54 weight percent. The total amount of alcohol soluble material removed amounted to 22 weight percent of the original sample. The remaining purified barium petroleum sulfonate was a tarry, resinous mass and had an ash content of 13.8 weight percent. The purified product was completely soluble in motor grade lubricating oil.

Ammonium sulfonates and unreacted hydrocarbon oils are readily soluble in hot isopropyl alcohol and one extraction with from 2 to 4 volumes of boiling isopropyl alcohol is usually sufficient to remove the major portion of these impurities, however, I prefer to conduct 2 or 3 extractions with smaller volumes of alcohol, for example, 3 extractions with 2 volumes of boiling isopropyl alcohol for each extraction. An especially preferred method of extraction is a continuous counter-current extraction process. Continuous extraction methods are well known in the art.

The average molecular weight of the alkaline earth petroleum sulfonates purified according to the process of this invention is usually about 1800. The preferred hydrocarbon fraction utilized in the sulfonation step will usually contain an average of 58 carbon atoms per molecule with a minimum of about 36 carbon atoms per molecule. The alkaline earth petroleum sulfonate will then contain an average of about 116 carbon atoms per molecule.

The preferred extraction temperature is about the boiling point of isopropyl alcohol (180° F.) at atmospheric pressure, however, temperatures from 90° F. to the boiling point of isopropyl alcohol, at the pressure being utilized, are possilble. The mixture is advantageously cooled slightly below the boiling point of the alcohol before making the separation. The alkaline earth petroleum sulfonates prepared by the process of copending application Serial No. 478,839 are substantially insoluble in the isopropyl alcohol under such conditions. At temperatures above 90° F. the unreacted hydrocarbons and any ammonium petroleum sulfonates are more soluble than at lower temperatures and furthermore their viscosities are reduced so that better contacting is possible.

EXAMPLE III

A sample of a commercially available calcium petroleum sulfonate was extracted once with isopropyl alcohol. The mixture of alcohol and sulfonate was heated to the boiling point of the alcohol and at this point all of the calcium petroleum sulfonate dissolved in the alcohol. The mixture was cooled to room temperature and a phase separation occurred at this temperature. The alcohol extract was removed and the extract and the residue were analyzed for ash content. The results of the analysis are compared with the ash content of the original sulfonate in Table I. Both the alcohol soluble phase and the alcohol insoluble phase are completely soluble in lubricating oil.

Table I

| Sample: | Ash content, weight percent |
|---|---|
| Original sulfonate | 7.24 |
| Alcohol extract phase | 6.82 |
| Alcohol insoluble phase | 8.01 |

The results of Example III show that alkaline earth petroleum sulfonates prepared by methods other than that described in copending application Serial No. 478,839 and having properties different from the alkaline earth petroleum sulfonates of that application can be purified and concentrated by the process of this invention.

Variations and modifications are possible within the scope of the disclosure of the present invention, the essence of which is a method for purifying alkaline earth petroleum sulfonates which comprises extracting organic impurities from the sulfonates with hot isopropyl alcohol.

That which is claimed is:

1. In a method for producing alkaline earth petroleum sulfonates comprising sulfonating a hydrocarbon fraction containing a component having a viscosity between about 80 and 700 SUS at 210° F., neutralizing a resulting reaction product with anhydrous ammonia, extracting the ammonium petroleum sulfonate with an organic solvent and converting the ammonium petroleum sulfonate to an alkaline earth petroleum sulfonate, the improvement comprising extracting ammonium sulfonate and unreacted hydrocarbons from said alkaline earth petroleum sulfonates with boiling isopropyl alcohol.

2. The method for removing impurities comprising ammonium petroleum sulfonates and hydrocarbons from calcium petroleum sulfonates containing said impurities and produced from a petroleum hydrocarbon fraction having a viscosity of about 80 to 700 SUS at 210° F. which comprises intimately contacting said calcium petroleum sulfonate with from 2 to 4 volumes of boiling isopropyl and separating insoluble calcium petroleum sulfonate from said isopropyl alcohol.

3. The method for removing impurities comprising ammonium petroleum sulfonate and hydrocarbons from barium petroleum sulfonate containing said impurities and produced from a petroleum hydrocarbon fraction having a viscosity of about 80 to 700 SUS at 210° F. which comprises intimately contacting said barium petroleum sulfonate with from 2 to 4 volumes of boiling isopropyl alcohol and separating insoluble barium petroleum sulfonate from said isopropyl alcohol.

4. The method for removing impurities comprising ammonium petroleum sulfonates and hydrocarbons from admixture with alkaline earth petroleum sulfonates produced from a petroleum hydrocarbon fraction having a viscosity of about 80 to 700 SUS at 210° F. which comprises extracting said impurities therefrom with a solvent consisting essentially of hot isopropyl alcohol.

References Cited in the file of this patent

UNITED STATES PATENTS

| | | |
|---|---|---|
| 1,387,868 | Robinson | Aug. 16, 1921 |
| 2,068,149 | Myers et al. | Jan. 19, 1937 |
| 2,459,995 | Duncan et al. | Jan. 25, 1949 |
| 2,713,034 | Clarke et al. | July 12, 1955 |